United States Patent
Frazier

(10) Patent No.: US 10,343,587 B2
(45) Date of Patent: Jul. 9, 2019

(54) TRUCK CARGO SECURING DEVICE

(71) Applicant: Shawn D. Frazier, Dubuque, IA (US)

(72) Inventor: Shawn D. Frazier, Dubuque, IA (US)

(73) Assignee: Shawn D. Frazier, Dubuque, IA (US)

( * ) Notice: Subject to any disclaimer, the term of this patent is extended or adjusted under 35 U.S.C. 154(b) by 107 days.

(21) Appl. No.: 15/605,269

(22) Filed: May 25, 2017

(65) Prior Publication Data

US 2018/0339638 A1    Nov. 29, 2018

(51) Int. Cl.
B60P 7/08    (2006.01)
(52) U.S. Cl.
CPC .................................. B60P 7/0807 (2013.01)
(58) Field of Classification Search
CPC ..... B60P 7/0807; B60P 7/0823; B60P 7/0815; B60P 3/07; B60P 3/40; B60P 7/06; B60P 7/0876; B60P 7/0892
USPC ....... 410/101, 106, 102, 116, 97, 81, 84, 90; 248/499, 500, 503, 419, 424, 429, 692
See application file for complete search history.

(56) References Cited

U.S. PATENT DOCUMENTS

| | | | | |
|---|---|---|---|---|
| 3,613,972 A | * | 10/1971 | Daughhetee | B62D 43/08 224/42.24 |
| 3,765,636 A | * | 10/1973 | Burrell | F17C 13/084 248/313 |
| 4,327,849 A | | 5/1982 | Sharpton | |
| 4,625,900 A | * | 12/1986 | Lawson | B60R 9/06 224/511 |
| 5,799,849 A | | 9/1998 | Beer et al. | |
| 9,475,432 B1 | * | 10/2016 | Rauschert | B60R 11/00 |
| 2016/0325669 A1 | | 11/2016 | Byham | |
| 2017/0120960 A1 | | 5/2017 | Whitmill | |

OTHER PUBLICATIONS

International Search Report and Written Opinion mailed in PCT/US2018/034115, dated Jul. 30, 2018.

* cited by examiner

*Primary Examiner* — D Glenn Dayoan
*Assistant Examiner* — Sunsurraye Westbrook
(74) *Attorney, Agent, or Firm* — Bell & Manning, LLC

(57) ABSTRACT

A truck cargo securing device includes a mounting post configured to mount to a truck bed anchor. The mounting post includes a body that includes one or more holes configured to receive a fastener. The mounting post also includes a flange adjacent to the body. The truck cargo securing device also includes a securing plate configured to mount to the flange of the mounting post. The securing plate includes a plurality of apertures, where each of the plurality of apertures is configured to receive at least a portion of a tie-down mechanism.

17 Claims, 4 Drawing Sheets

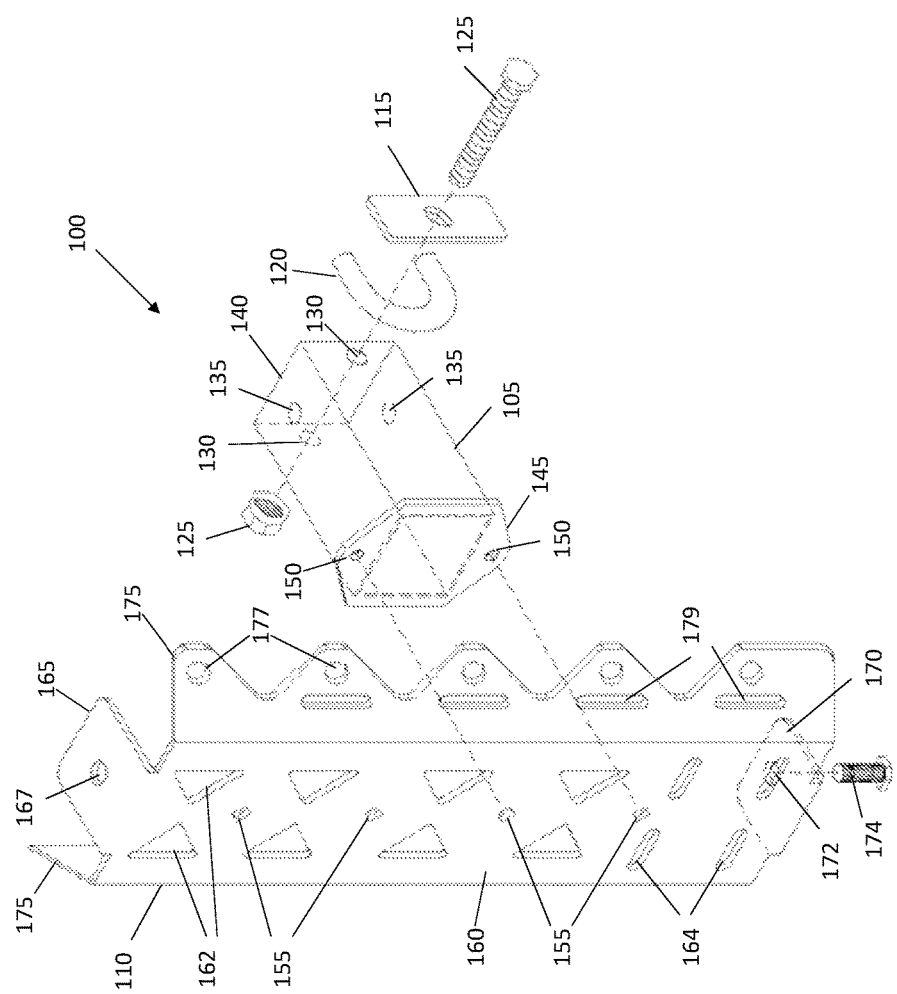

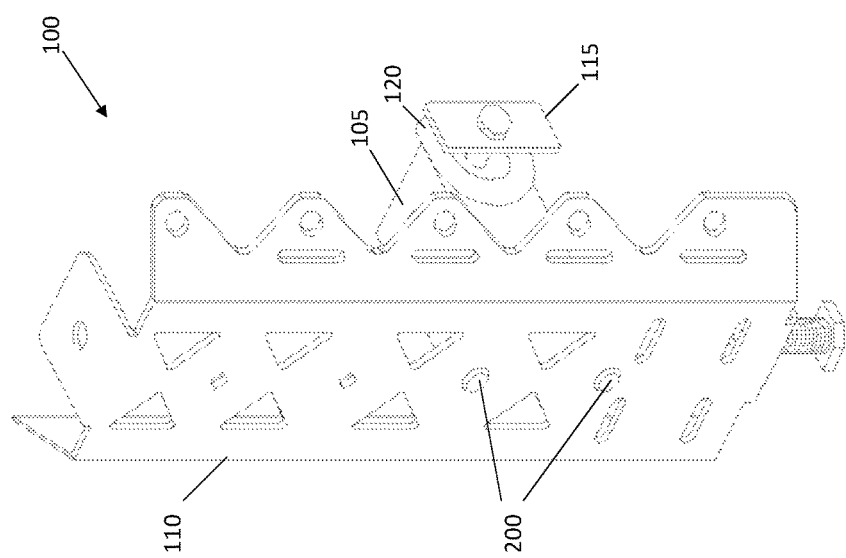

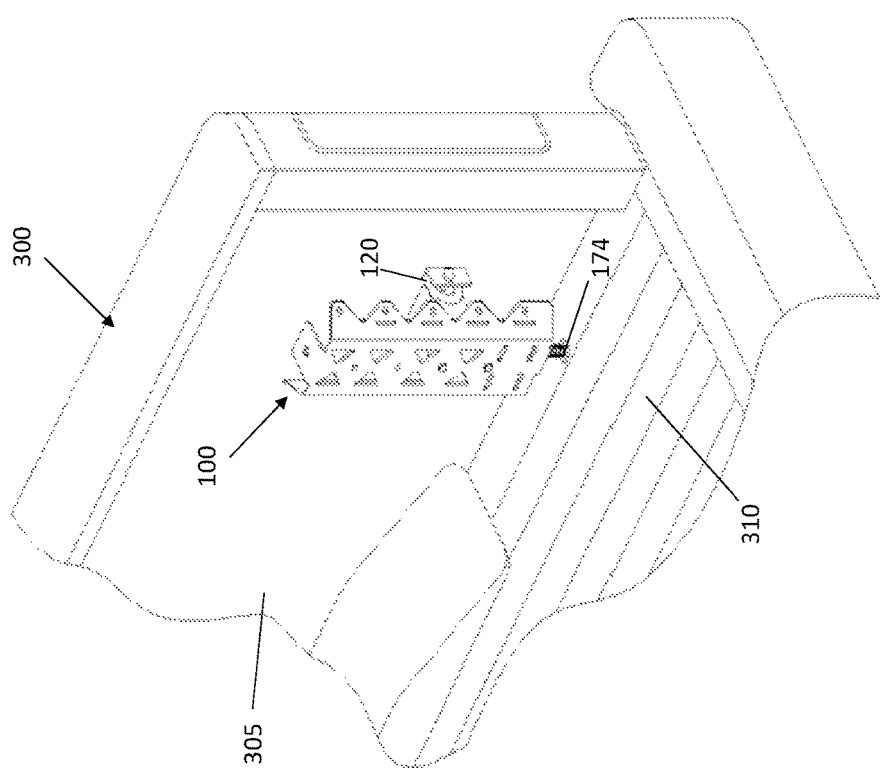

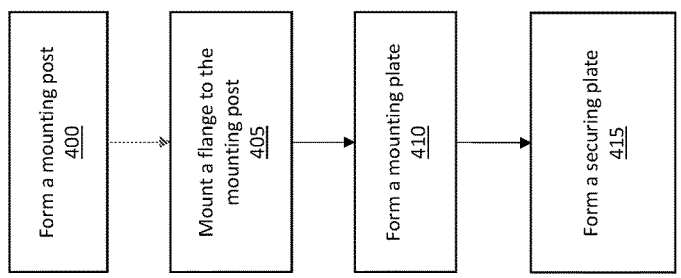

TRUCK CARGO SECURING DEVICE

BACKGROUND

The following description is provided to assist the understanding of the reader. None of the information provided or references cited is admitted to be prior art.

A passenger truck is a type of motor vehicle that typically includes an engine compartment at the front end of the truck, a passenger area adjacent to and separate from the engine compartment, and a truck box located at the rear end of the truck. The truck box can be used for many purposes, including hauling cargo. To facilitate cargo hauling, many truck manufacturers have started including one or more tie-down anchors that can be used to help secure items in the truck bed and prevent them from moving around while the truck is in motion. Typical tie-down anchors are in the form of metal rings or loops that are mounted on a bottom or sidewall of the box of the truck.

SUMMARY

An illustrative truck cargo securing device includes a mounting post configured to mount to a truck bed anchor. The mounting post includes a body that includes one or more holes configured to receive a fastener. The mounting post also includes a flange adjacent to the body. The truck cargo securing device also includes a securing plate configured to mount to the flange of the mounting post. The securing plate includes a plurality of apertures, where each of the plurality of apertures is configured to receive at least a portion of a tie-down mechanism.

An illustrative method of making a truck cargo securing device includes forming a mounting post that includes a body and a flange adjacent to the body, where the mounting post is formed to mount to a truck bed anchor. The method also includes forming one or more holes in the mounting post, where the one or more holes are configured to receive a fastener. The method also includes forming a securing plate that is configured to mount to the flange of the mounting post. The method further includes forming a plurality of apertures in the mounting post, where each of the plurality of apertures is configured to receive at least a portion of a tie-down mechanism.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 1 is an exploded view of a truck cargo securing device in accordance with an illustrative embodiment.

FIG. 2 is a perspective view of a truck cargo securing device mounted to a truck box anchor in accordance with an illustrative embodiment.

FIG. 3 is a partial view of a truck box that includes a truck box anchor and a truck cargo securing device mounted to the truck box anchor in accordance with an illustrative embodiment.

FIG. 4 is a flow diagram depicting operations performed to manufacture a truck cargo securing device in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Traditional truck box anchors are often in the form of a metal loop or a metal tab having an embedded hole. The loop or embedded hole is configured to receive at least a portion of a tie-down mechanism used to secure cargo such as a ratchet strap, bungee cord, hook and loop nylon straps (with or without Velcro), string, rope, cargo net, chain, etc. For example, the truck box anchor can receive one or more securing ends of a tie-down mechanism, in the form of hooks, loops, knots, etc. The loop or embedded hole in the truck box anchor can also receive a portion of the body of the tie-down mechanism itself. For example, the strap, cord, string, rope, net, chain, etc. of the tie-down mechanism can be run through the metal loop or embedded hole, and the securing ends of the tie-down mechanism can be secured either to the metal loop/embedded hole or elsewhere, depending on the cargo being secured.

Truck box anchors are often mounted to a sidewall of the truck box, and can be either vertically or horizontally oriented relative to a bottom wall of the truck box. Alternatively, truck box anchors can be mounted to the bottom wall of the truck box, to an end wall of the truck box, to the tailgate of the truck box, to a wheel well in the truck box, etc. The metal loop or metal tab of the truck box anchor is typically rigidly mounted to the truck box, however some implementations allow the truck box anchor to pivot and/or rotate relative to the surface on which it is mounted. Different vehicle manufacturers include different numbers of truck box anchors on their vehicles, but a typical truck box has at least two anchors and some truck boxes have four or more such anchors.

As discussed above, a traditional truck box anchor is in the form of a rigid (or sometimes movable) metal loop or metal tab having an embedded hole. Such anchors are able to effectively secure large cargo such as an all-terrain vehicle, riding lawnmower, snow blower, snowmobile, etc. However, due to their configuration, currently available truck box anchors are unable to effectively and safely securely smaller items such as gas cans, propane canisters, coolers, and other smaller items of varying shapes. For example, a single loop or tab with an embedded hole that makes up a traditional truck box anchor provides only a single point of attachment, which does not work for some smaller cargo items. Additionally, the single loop or tab of traditional truck box anchors is not vertically or otherwise adjustable to accommodate cargo items of different sizes. As a result, smaller cargo items secured to traditional truck box anchors can slide around and sometimes detach from the anchor, causing inconvenience, potentially damaged cargo, and a possible safety issue depending on the cargo.

Described herein is a truck cargo securing device that overcomes the above-discussed limitations of traditional truck box anchors. The truck cargo securing device is configured to mount to an existing truck box anchor using standard fasteners. The truck cargo securing device allows for universal mounting and is compatible with existing truck box anchors from any of the major light duty pickup truck manufacturers (e.g., Chevrolet/GM, Ford, Dodge, Toyota, Nissan, etc.) regardless of the orientation or configuration of the existing anchor. Additionally, the truck cargo securing device includes numerous tie down locations that accommodate cargo of varying size and shape.

FIG. 1 is an exploded view of a truck cargo securing device 100 in accordance with an illustrative embodiment. The truck cargo securing device 100 includes a mounting post 105 and a securing plate 110 which is configured to attach to the mounting post 105. The truck cargo securing device 100 also includes a mounting plate 115 that is used to help secure the truck cargo securing device 100 to a truck box anchor 120. In alternative embodiments, the truck cargo securing device 100 may include additional, fewer, and/or different components, depending on the specific application.

As depicted in FIG. 1, the mounting post 105 is in the form of a square tube formed from a 16 gage metal, such as steel. Alternatively, the mounting post 105 can be formed from a C-channel or L-shaped angle iron. In other alternative embodiments, the mounting post 105 can have a different shape such as circular, ovular, rectangular, etc., and can be formed from a different gage of material and/or a non-metal material. In another alternative embodiment, the mounting post 105 may be at least partially solid instead of being a hollow tube throughout its length. In one embodiment, the mounting post has a width and height of 2 inches and a length of 4.5 inches. Alternatively, different dimensions may be used depending on the implementation. A body of the mounting post 105 also includes a pair of holes 130 and a pair of holes 135, as discussed in more detail below. In one embodiment, the pairs of holes 130 and 135 have a diameter of $7/16$ of an inch, but can have a different diameter in different embodiments. In another illustrative embodiment, centers of the pair of holes 130 are centrally positioned in the top/bottom faces of the body of the mounting post 105 and are $3/4$ of an inch from an end 140 of the mounting post 105. Centers of the pair of holes 135 are centrally positioned in the side faces of the body of the mounting post 105 and are $1/2$ of an inch from the end 140 of the mounting post 105. In alternatively embodiments, the pairs of holes 130 and 135 can be in different positions. In one embodiment, the centers of the pairs of holes 130 and 135 are the same distance from the end 140 of the mounting post 105.

In an illustrative embodiment, a fastener 125 passes through the mounting plate 115, through the truck box anchor 120, and through the body of the mounting post 105 to secure the mounting post 105 to the truck box anchor 120. In an illustrative embodiment, the fastener 125 is a bolt and nut that threads onto the bolt. One or more washers may also be used in conjunction with the fastener 125. In an alternative embodiment, any other type of fastener may be used such as a pin, screw, clamp, etc. As shown in FIG. 1, the truck box anchor 120 is vertically oriented such that a plane containing the opening in the truck box anchor 120 is substantially perpendicular to a bottom of the truck bed (not shown). In this configuration, the fastener 125 passes through a pair of holes 130 formed in the sides of the mounting post 105. In an alternative configuration in which the plane containing the opening in the truck box anchor is substantially parallel to the bottom of the truck bed, the fastener can be placed through a pair of holes 135 in the top/bottom of the mounting post 105 to secure the mounting post 105 to the truck box anchor 120. The mounting post 105 therefore enables universal mounting of the truck cargo securing device 100, regardless of the position or orientation of the truck box anchor(s).

In the mounting configuration depicted in FIG. 1, the truck box anchor 120 is positioned between the mounting plate 115 and the mounting post 105. The mounting plate 115 provides a rigid surface to support a head of the fastener 125 and to prevent the head of the fastener 125 from slipping through the opening in the truck box anchor 120. In an illustrative embodiment, the mounting plate 115 is formed from 11 or 14 gage material such as steel, and has a width of 1 inch, a length of 2.5 inches, and a centrally positioned hole that is $7/16$ of an inch in diameter. In alternative embodiments, the gage, material, size, and/or hole placement may differ, depending on the specific mounting application. In another alternative embodiment, the mounting plate 115 may not be used, or the mounting plate may be of a different shape depending on the shape and orientation of the truck box anchor to which installation is being performed.

The mounting post 105 also includes a flange 145, which is adjacent to the body of the mounting post 105 and positioned opposite of the end 140 of the mounting post 105. The flange 145 is used to secure the mounting post 105 to the securing plate 110. In an illustrative embodiment, the flange 145 is formed from 11 or 14 gage material such as steel, and has a width of 2.5 inches, a height of 3.5 inches, and a pair of holes 150. In alternative embodiments, the gage, material, size, number of holes, and/or hole placement may differ, depending on the specific mounting application. In the embodiment of FIG. 1, the flange 145 has a hexagonal shape with rounded corners. In alternative implementations, a different shape may be used. In an illustrative embodiment, the flange 145 is permanently mounted to the body of the mounting post 105 via a weld or other fabrication technique. Alternatively, the flange 145 may be detachable from the body of the mounting post 105 in some implementations.

Fasteners (not shown) can be used to mount the securing plate 110 to the mounting post 105 in a plurality of distinct positions. For example, the securing plate 110 includes mounting holes 155, each adjacent pair of which aligns with the pair of holes 150 in the flange 145. As such, the securing plate 110 can be mounted to the mounting post 105 in a number of different positions to suit the specific cargo which is to be secured. Any type of fasteners can be used to mount the securing plate 110 to the mounting post 105, including nuts and bolts, screws, pins, etc. FIG. 1 depicts the securing plate 110 mounted to the mounting post 105 such that two side flanges 175 of the securing plate 110 extend toward the mounting post 105. In an alternative embodiment, the securing plate 110 can be mounted backwards such that the two side flanges 175 extend away from the mounting post 105. In another alternative embodiment, the securing plate 110 can be mounted horizontally by rotating the body of the mounting post 105 by 90 degrees and mounting it to the truck box anchor 120 using the pair of holes 135.

The securing plate 110 includes a main face 160, and attached to the main face 160 are a top flange 165, a bottom flange 170, and the two side flanges 175. The securing plate 110 can be made from 11 or 14 gage material such as steel. Alternatively, different materials and/or gages may be used. In one embodiment, an overall height (or length) of the securing plate 110 is 14 inches. Alternatively, different heights may be used, including 10 inches, 12 inches, 16 inches, 18 inches, 20 inches, etc. An overall width of the securing plate 110 (including the side flanges 175) is 7 inches, however it is to be understood that different widths may be used in different embodiments.

As discussed above, the main face 160 of the securing plate 110 includes the mounting holes 155 for attaching the securing plate 110 to the flange 145 of the mounting post 105. The main face 160 also includes a plurality of apertures in the form of openings 162 and slots 164 that are configured to receive a securing end and/or body of a tie-down mechanism for securing cargo, such as a ratchet strap, hook and loop nylon straps (with or without Velcro), bungee cord, string, rope, cargo net, chain, etc. In the embodiment of FIG. 1, the main face 160 includes 12 apertures in the form of 8 openings 162 and 4 slots 164. The openings 162 are in the form of triangles and the slots 164 are in the form of horizontally oriented ovals. In an alternative embodiment, a different number, shape, position, and/or orientation of the openings 162 and/or the slots 164 may be used. In an alternative embodiment, the openings 162 (or similar apertures) may not be used for securing cargo, but can instead be included for aesthetic purposes and/or to reduce the overall weight of the device.

The top flange 165 of the securing plate 110 is mounted perpendicular to the main face 160 and has a length of 2 inches. In alternative embodiments, the top flange 165 may be mounted at a different angle relative to the main face 160, including parallel thereto, and may have a different length and/or shape. The top flange 165 includes an aperture in the form of a hole 167 that can be used to receive a securing end and/or body of a tie-down mechanism for securing cargo. Depending on the number and location of available truck box anchors in a given installation, the top flange 165 can also be used to mount the securing plate 110 to a truck box anchor.

The bottom flange 170 of the securing plate 110 is mounted perpendicular to the main face 160 and has a length of 2 inches. In alternative embodiments, the bottom flange 170 may be mounted at a different angle relative to the main face 160, including parallel thereto, and may have a different length and/or shape. The bottom flange 170 includes an aperture in the form of a hole 172 that is configured to receive a bottom flange fastener 174 to provide additional support to the truck securing cargo device 100. In one embodiment, the bottom flange fastener 174 can mate with a threaded hole in a bottom of the truck box to attach the securing plate 110 to the box. In another embodiment, the bottom flange fastener 174 can thread into the hole 172 such that a head of the fastener contacts the bottom of the truck box to provide additional support to the securing plate 110. In yet another embodiment, the bottom flange fastener 174 can thread into one of the pairs of holes 130 and 135, depending on the orientation of the mounting post 105, such that the securing plate has another point of attachment to the mounting post 105. The bottom flange fastener 174 is depicted as a bolt, however any type of fastener may be used. In an alternative embodiment, the hole 172 in the bottom flange 170 can be used to receive a securing end and/or body of a tie-down mechanism for securing cargo.

The side flanges 175 are mounted at an angle relative to the main face 160. In an illustrative embodiment, the angle is approximately 45 degrees. However, in alternative embodiments, any other angle may be used. In an illustrative embodiment, a straight line distance measured perpendicular to the main face 160 and extending from the main face 160 to a rearmost position of the side flanges 175 is 1⅛ inches. Alternatively, a different distance may be used depending on the width of the side flanges 175 and the angle at which they are mounted to the main face 160. The side flanges 175 each include a plurality of apertures in the form of holes 177 and slots 179, each of which is configured to receive a securing end and/or body of a tie-down mechanism for securing cargo. As depicted in FIG. 1, the side flanges 175 each have 5 holes 177 and 4 vertically oriented slots 179. In alternative embodiments, different numbers, positions, and/or orientations of the holes 177 and/or slots 179 may be used. Each of the side flanges 175 also includes a sawtooth edge that includes peaks and valleys. The valleys of the sawtooth edge can be used to help secure a body of a tie-down mechanism. In an alternative embodiment, the edges of the side flanges 175 may be straight or may have a different type of sawtooth pattern. As described herein, the side flanges 175 are identical to one another. In alternative embodiments, each of the two side flanges 175 may differ from one another in the number, size, and/or types of holes and slots. The two side flanges 175 may also be mounted at different angles relative to the main face 160.

The truck cargo securing device 100 can be rapidly and easily mounted to an existing truck bed anchor by an end user with a mounting plate and a fastener as described above. The various above-described holes, openings, and slots in the securing plate 110 of the truck cargo securing device 100 are configured to receive tie-down mechanisms, thereby allowing the user to secure cargo. Unlike a traditional truck bed anchor with a statically positioned single securing location, the variety of apertures on the securing plate 110 (i.e., the holes, openings, and slots) enables the user to control how the tie-down mechanism interacts with and contacts the cargo to help ensure that the cargo does not tip over or let loose.

In an illustrative embodiment, the components of the truck cargo securing device 100 are made of a rigid material such as a stainless or other type of steel. In alternative embodiments, the components of the truck cargo securing device 100 can be made of other types of materials such as aluminum, hard plastic, titanium, etc. Additionally, while the truck cargo securing device 100 of FIG. 1 has been depicted and described as having a mounting post 105 secured to a securing plate 110 via fasteners, it is to be understood that the embodiments described herein are not so limited. For example, in an alternative embodiment, the mounting post 105 may be permanently attached to the securing plate 110 via a weld, solder, adhesive, or other fabrication method. In another alternative embodiment, the mounting post 105 and the securing plate 110 may be molded, stamped, or otherwise formed as a single, integrated component.

FIG. 2 is a perspective view of the truck cargo securing device 100 mounted to the truck box anchor 120 in accordance with an illustrative embodiment. Depicted in FIG. 2 are fasteners 200 that are used to secure the securing plate 110 to the mounting post 105. As discussed above, the fasteners 200 can be any type of fasteners, including nuts and bolts, screws, pins, etc.

FIG. 3 is a partial view of a truck box 300 that includes the truck box anchor 120 and the truck cargo securing device 100 mounted to the truck box anchor 120 in accordance with an illustrative embodiment. As depicted in FIG. 3, the truck box 300 includes a sidewall 305 and a bottom wall 310. The truck cargo securing device 100 is mounted to the truck box anchor 120, which in turn is mounted to the sidewall 305 of the truck box 300. Also depicted in FIG. 3 is the interaction between the bottom flange fastener 174 with the bottom wall 310 of the truck box 300. Specifically, in the embodiment of FIG. 3, the bottom flange fastener 174 acts as an adjustable support leg for the truck cargo securing device 100 that is in contact with the bottom wall 310.

FIG. 4 is a flow diagram depicting operations performed to manufacture a truck cargo securing device in accordance with an illustrative embodiment. In alternative embodiments, fewer, additional, and/or different operations may be performed. Also, the use of a flow diagram is not meant to be limiting with respect to the order of operations performed. In an operation 400, a mounting post is formed. In an illustrative embodiment, the mounting post can be a square tube having dimensions and holes as described with reference to the mounting post 105 discussed herein. Alternatively, the formed mounting post may have a different shape, different dimensions, a different number of holes, and/or different positions of the holes. The mounting post can be formed by cutting a section of square tube (or other material) to a desired length and using a drill to make the holes. Alternatively, the mounting post can be formed by molding, stamping, and/or any other fabrication techniques known in the art.

In an operation 405, a flange is mounted to the mounting post. The flange can be the same as the flange 145 discussed with reference to FIG. 1. Alternatively, the flange may have a different shape, a different number of holes, and/or different positions of the holes. In an illustrative embodiment, the flange is mounted to the mounting post via welding, soldering, or application of an adhesive. In alternative embodiment, the flange and mounting post may be formed as an integral unit through molding or a similar process. In an operation 410, a mounting plate is formed. In an illustrative embodiment, the mounting plate can be the same as the mounting plate 115 discussed with reference to FIG. 1. Alternatively, the mounting plate may have a different size, shape, number of holes, etc.

In an operation 415, a securing plate is formed. The securing plate can be the same as the securing plate 110 discussed with reference to FIG. 1. Alternatively, the securing plate may have a different shape, different dimensions, different numbers and/or placement of holes, openings, and slots, and/or a different flange configuration. In an illustrative embodiment, the securing plate, including flanges, is cut or stamped from a metal sheet. In such an implementation, the flanges are bent to the desired angle once the securing plate is cut, and the holes, slots, and openings are formed by drilling, laser cutting, etc. In an alternative embodiment, the main face of the securing plate may be formed and the flanges may be attached to the main face via welding, soldering, etc. In another alternative embodiment, the securing plate and flanges may be formed in a mold. In such an embodiment, the holes, slots, and openings of the securing plate may be formed in the mold, or they may be incorporated after the securing plate is molded, depending on the implementation.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A truck cargo securing device comprising:
   a mounting post configured to mount to a truck bed anchor, wherein the mounting post includes:
      a body that includes one or more holes configured to receive a fastener; and
      a flange adjacent to the body; and
   a securing plate configured to mount to the flange of the mounting post, wherein the securing plate includes a plurality of apertures, and wherein each of the plurality of apertures is configured to receive at least a portion of a tie-down mechanism; and
   wherein the securing plate includes a main face and a side flange attached to the main face at an angle, and wherein an edge of the side flange comprises a sawtooth edge.

2. The truck cargo securing device of claim 1, wherein the body of the mounting post comprises a square tube.

3. The truck cargo securing device of claim 1, further comprising a mounting plate configured to receive the fastener, wherein the mounting plate is positioned on a first side of the truck bed anchor and the body of the mounting post is positioned on a second side of the truck bed anchor.

4. The truck cargo securing device of claim 1, wherein the one or more holes in the body of the mounting post comprise a first pair of holes and a second pair of holes.

5. The truck cargo securing device of claim 4, wherein the first pair of holes are in a first pair of opposite sides of the body and the second pair of holes are in a top side and a bottom side of the body.

6. The truck cargo securing device of claim 4, wherein the first pair of holes are a first distance from an end of the body and the second pair of holes are a second distance from the end of the body, and wherein the first distance is different than the second distance.

7. The truck cargo securing device of claim 1, wherein the main face includes at least a portion of the plurality of apertures.

8. The truck cargo securing device of claim 7, wherein the main face includes a plurality of holes that align with one or more holes on the flange.

9. The truck cargo securing device of claim 8, wherein the plurality of holes in the main face allow the main face to be mounted to the flange in a plurality of positions.

10. The truck cargo securing device of claim 1, wherein the side flange includes at least a portion of the plurality of apertures.

11. The truck cargo securing device of claim 7, wherein the securing plate further comprises a top flange attached to the main face, and wherein the top flange includes at least one of the plurality of apertures.

12. The truck cargo securing device of claim 7, wherein the securing plate further comprises a bottom flange attached to the main face.

13. The truck cargo securing device of claim 12, wherein the bottom flange is configured to receive a bottom flange fastener such that a head of the bottom flange fastener contacts a bottom of a truck box that includes the truck bed anchor to provide support to the securing plate.

14. The truck cargo securing device of claim 1, wherein at least a portion of the plurality of apertures comprise openings with a triangular shape.

15. The truck cargo securing device of claim 1, wherein at least a first portion of the plurality of apertures comprise vertically oriented slots and at least a second portion of the plurality of apertures comprise horizontally oriented slots.

16. The truck cargo securing device of claim 1, wherein at least a portion of the plurality of apertures comprise holes.

17. A method of making a truck cargo securing device, the method comprising:
   forming a mounting post that includes a body and a flange adjacent to the body, wherein the mounting post is formed to mount to a truck bed anchor;
   forming one or more holes in the mounting post, wherein the one or more holes are configured to receive a fastener;
   forming a securing plate that is configured to mount to the flange of the mounting post, wherein forming the securing plate comprises forming a main face and one or more flanges attached to the main face, and wherein each of the one or more flanges is formed with a sawtooth edge; and
   forming a plurality of apertures in the mounting post, wherein each of the plurality of apertures is configured to receive at least a portion of a tie-down mechanism.

* * * * *